United States Patent [19]
Chaffin et al.

[11] Patent Number: 5,712,469
[45] Date of Patent: Jan. 27, 1998

[54] METHOD OF CURING INACCESSIBLE THERMOSET ADHESIVE JOINTS USING RADIO FREQUENCY DIELECTRIC HEATING

[75] Inventors: Kimberly Ann Chaffin, Plymouth, Minn.; Ray Alexander Dickie, Northville, Mich.

[73] Assignee: Ford Global Technologies, Inc., Dearborn, Mich.

[21] Appl. No.: 540,383

[22] Filed: Oct. 6, 1995

[51] Int. Cl.⁶ ............................................. H05B 6/62
[52] U.S. Cl. .................. 219/765; 219/634; 219/770; 219/780; 156/274.4; 156/380.2
[58] Field of Search ......................... 219/765, 767, 219/769, 633, 634, 770, 780; 156/273.9, 274.4, 379.7, 380.2

[56] References Cited

U.S. PATENT DOCUMENTS

| | | |
|---|---|---|
| 2,372,929 | 4/1945 | Blessing . |
| 3,574,024 | 4/1971 | Rose .................... 156/273.7 |
| 3,612,803 | 10/1971 | Klaas . |
| 3,888,715 | 6/1975 | Fraser et al. . |
| 4,555,607 | 11/1985 | Roentgen et al. ............. 219/765 |
| 4,680,065 | 7/1987 | Vansant et al. ............. 156/273.9 |
| 4,771,151 | 9/1988 | Pursell ......................... 219/633 |
| 5,183,969 | 2/1993 | Odashima . |
| 5,244,608 | 9/1993 | Andersen . |
| 5,248,864 | 9/1993 | Kodokian . |
| 5,264,064 | 11/1993 | Hughes . |
| 5,328,539 | 7/1994 | Salo . |
| 5,445,694 | 8/1995 | Gillner et al. ............. 156/273.9 |

Primary Examiner—Philip H. Leung
Attorney, Agent, or Firm—Joseph W. Malleck

[57] ABSTRACT

Method of curing inaccessible thermoset adhesive joints, comprising: forming structures to be bonded at mating surfaces when assembled, the shortest distance from the mating surfaces to the exterior of the assembly inhibiting the application of radio frequency heating by exterior electrodes; while forming the structures, molding into a least one of the structures, spaced from the surfaces to be adhered, a fiber or film-like electrode of sufficient thickness and spacing to project radio frequency waves through such one structure to the adhesive when energized; assembling the surfaces together with a thermoset adhesive therebetween in intimate contact of each of the surfaces; and connecting the fibrous or thin filmed electrode in a circuit for passing radio frequency waves across the adhesive to effect dielectric heating of the adhesive for a controlled period of time and at a predetermined temperature rise for curing.

8 Claims, 2 Drawing Sheets

METHOD OF CURING INACCESSIBLE THERMOSET ADHESIVE JOINTS USING RADIO FREQUENCY DIELECTRIC HEATING

BACKGROUND OF THE INVENTION

1. Technical Field

This invention relates to the technology of heat curing thermoset adhesives and more particularly to curing adhesives placed deep within composite structures inaccessible to electromagnetic fields applied exteriorly for heating.

2. Discussion of the Prior Art

Thermoset adhesives have been long used to bond surfaces of structures together upon the application of heat. Such heat has been applied by conduction through one or both of the bonding surfaces when they are metallic, by convection when the assembled structures pass through a convection heating oven, or by high frequency radiant wave heating of the adhesive positioned as a dielectric, provided electrodes can be positioned to allow the radiant waves to penetrate and envelope the adhesive. Conductive heating limits the structures to be bonded to conductive materials and eliminates such materials as composites (glass fiber and polyester matrices) or which may contain energy insulating bodies such as foam. Convective heating takes too long and would be uneconomical for high volume, high productivity systems. Radiant heating is limited by the proximity of the electrodes and thus is unable to cure adhesives sandwiched between composites which may contain imbedded foam bodies or other radiant energy insulating materials. Radiant wave emitters have generally been in the form of electrodes or coils placed about the exterior of the structural assembly that is to be joined. In some cases high resistant susceptors have been placed in the adhesive to be excited by the radiant waves and give off heat which in turn cures the adhesive. (see U.S. Pat. Nos. 5,248,864 or 3,272,929).

SUMMARY OF THE INVENTION

It is an object of this invention to deliver radio frequency heating in a more economical manner to an adhesive bond line of a composite material joint having a complex, hidden or inaccessible joint configuration.

The method of this invention that meets the above object for curing inaccessible thermoset adhesive joints, comprises: (a) forming to be bonded at mating surfaces when assembled, the shortest distance from the mating surfaces to the exterior of said assembly inhibiting exterior applied radio frequency heating; (b) embedding a radio frequency emitter in closely spaced relation to and along the bonding surfaces in at least one of the structural parts of the assembly, the emitter being comprised of continuous or discontinuous fibers, powder, or, particles molded into an interior layer of at least such one structural part; (c) assembling the structural parts together with thermoset adhesive therebetween in intimate contact with each of the parts to define a bond line; and (d) connecting the emitter deposit in a circuit for generating radio frequency therefrom, the electromagnetic field from said emitters traversing such adhesive bond line to effect dielectric heating of the adhesive for a controlled period time and at a predetermined temperature rise for curing the adhesive.

Preferably the emitter is positioned between high radiant frequency insulating bodies that may have been laminated within such one structural part.

DETAILED DESCRIPTION AND BEST MODE

Radio frequency heating of a dielectric such as a thermoset adhesive bond line of interest to this invention, involves excitation of, both rotationally and translationally, molecules of the adhesive (polar and non-polar) as well as molecular parts such as electrons, protons, and ions. The molecules are subjected to an electromagnetic field to effect such excitation. Different glues vary in their moisture content, density and susceptibility to electromagnetic heating, all of which affects the response to radio frequency heating. The material of the structural joint, particularly when a material possesses other bodies that are not receptive to electromagnetic field penetration, must be considered because it affects uniform penetration of the electromagnetic field into the adhesive.

Figure 1:
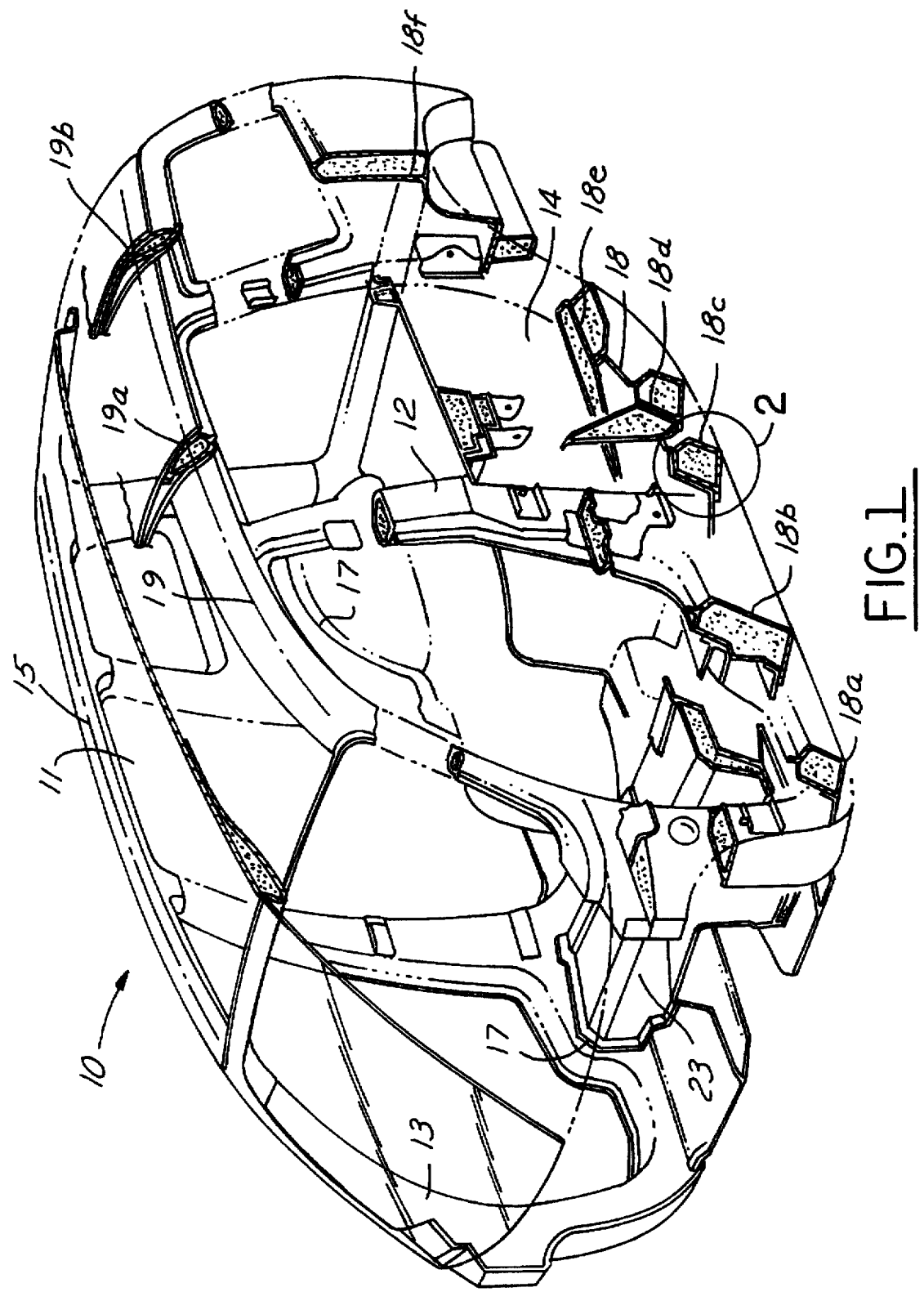
FIG. 1 is a perspective view of an automotive vehicle body assembly having a number of complex, hidden or inaccessible joints that are adhesively bonded, the view illustrating one mode of carrying out this invention.

This invention overcomes such difficulties by embedding or molding an emitter deposit which can function as an electrode in the composite joint material adjacent to, but spaced from but conforming to the contour of the joint bond line so that perpendicular radio frequency flux lines will traverse the adhesive. The capacitance field can be controlled precisely to reduce power losses in the joint material; the distribution of the electrical field will inherently be more uniform across the adhesive bond line by the use of discontinuous fibers, powders or particles each functioning as an emitter. As shown in FIG. 1, an automotive body structure 10 of shaped fiber glass panels 11, 12, 13 and 14 are adhesively bonded along complex joints 15, 16, 17 and 18, the bond lines being inaccessible. The structure to be joined incorporates foam bodies 20 or foam layers 21 which are useful because they allow large, complex structural parts to be fabricated in one piece. Such bodies or layers are laminated or sandwiched between layers 22 of the fiber glass panel which typically are 1–10 mm thick (but could be much greater) to have the necessary structural strength and integrity. The prior art heretofore has attempted to utilize only electrodes exterior to the joint structure but the gap allowable between such electrodes, particularly when there is present insulating bodies that inhibit transfer of radio frequency waves, would have to be so great that power losses would affect the quality of adhesive curing.

The essential steps of the inventive method for curing inaccessible thermoset adhesive joints comprises: (a) forming structures to be bonded at mating surfaces when assembled and having embedded high loss bodies, the shortest distance from the mating surfaces to the exterior of the assembly inhibiting exterior applied radio frequency heating; (b) while forming such structures, molding into at least one of the structures, between the high loss bodies and mating surfaces, but spaced from the mating surfaces to be adhered, a fiber or film-like electrode of sufficient thickness and spacing to project radio frequency waves through one such structure to the adhesive; (c) assembling the surfaces together with thermoset adhesive therebetween in intimate contact with each of the mating surfaces; and (d) connecting the fibers or thin film electrode in a circuit for passing radio frequency waves across the adhesive to effect dielectric heating of the adhesive for controlled curing over a period of time and at a predetermined temperature rise.

Referring again to FIG. 1, the automotive body 10 is comprised of five major panels: sidewalls 11 and 12, roof 13, floor 14 and cross-support 23. Each of these major panels may be formed of fiber glass sheeting or equivalent resin laminated material that allows passage of radio frequency waves. Such fiber glass sheets can be reinforced by large sections of insulating bodies 20 or layers 21 preferably of foam material which may range in maximum thickness from about 1-6 inches as illustrated. The advantage of laminated fiber glass sheeting is that very large structural body sections can be easily formed as complex laminations with high structural strength. The foam bodies are necessary because they allow large, complex structural parts to be fabricated in one piece.

The major panels are joined together at overlapping joint lines such as joint line 18 which is depicted at cut-away locations 18a, 18b, 18c, 18d, 18e and 18f between side wall panel 12 and floor panel 14. A similar joint line 19 between the roof panel 11 and sidewall panel 12 is shown in cut-away sections 19a and 19b. Although the joint line, between flanges of the structure to be formed, may be formed as overlaid, overlapping or butted, the flanges must matingly meet at a predetermined joint location along which the thermoset adhesive can reach both of such mating flanges.

Figure 2:
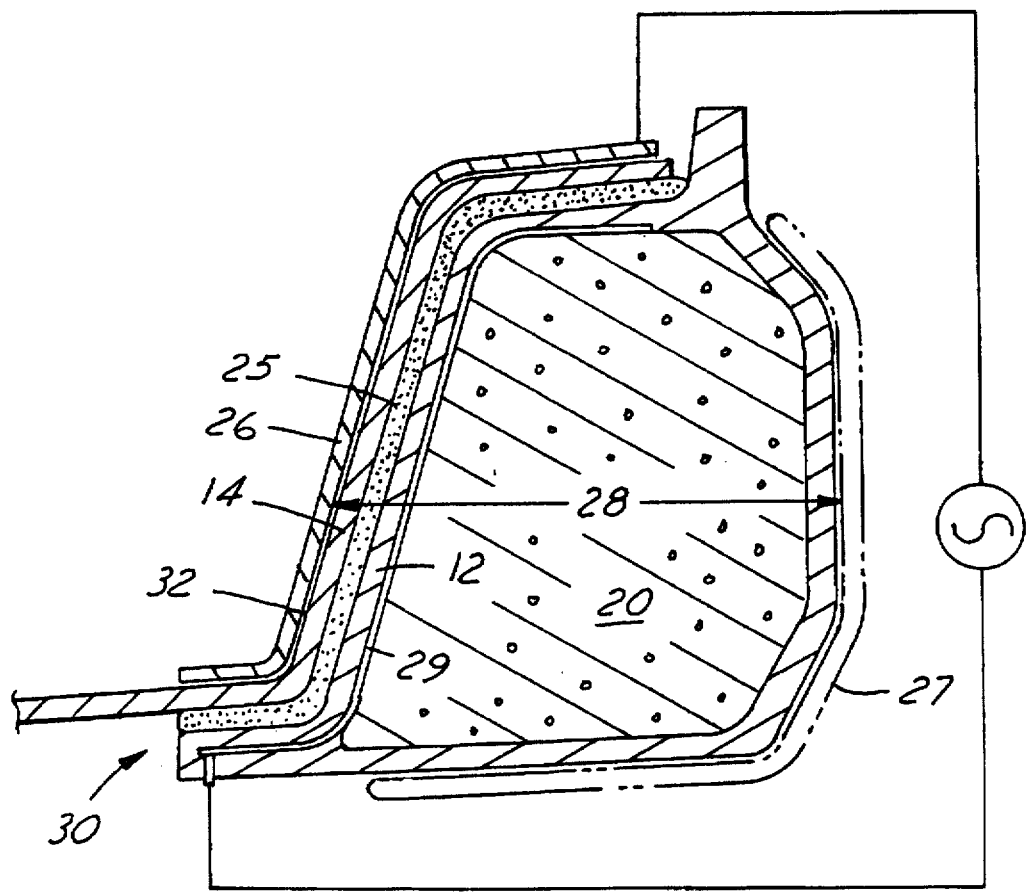
FIG. 2 is an enlarged view of a portion of FIG. 1 showing emitter deposit molded in one of the structural part to function as an electrode.

As shown in FIG. 2, the structures 12 and 14 are adhesively bonded along the joint line 18 by thermosetting adhesive 25 placed between the panel structures. Radio frequency heating is difficult because a pair of externally placed electrodes (actual electrode 26 and hypothetical electrode 27) cannot be located or placed sufficiently close, when the gap 28 therebetween is too great. When the gap becomes too large will depend on the effect the material in the gap has on a radio frequency field and on the strength (voltage) of such field. For fiberglass material this will typically be about 2 cm. Such extended gap is necessary to facilitate penetration of the electrical field therebetween. If the gap is too large, the radio frequency field will not be able to effectively heat the adhesive as a dielectric and much of the radio frequency heating will be lost in the foam bodies or other material.

The foam bodies 20 facilitate manufacturing of the shaped laminated bodies in a single composite molding operation, but their presence makes use of a pair of exterior located electrodes impossible; the direct or fringe field of the electrodes will be lost or consumed by the foam (dielectric loss). Therefore effective dielectric heating of the adhesive will not take place.

This difficulty is overcome by a molding insitu an electrode material 29 into at least one of the panels to be joined along the joint line 18; the material 29 is deposited during shaping and lamination of the panel under heat and pressure. The embedded electrode material 29 is selected from the group of carbon, low carbon steel, aluminum, iron and any other material that can be molded that would have a high electrical conductivity, and will act as an emitter of radio frequency waves. The electrode material is in the form of a fiber or thin film that is electrically conductive over its length and area of deposit; it is preferably uniformly distributed as loose short fibers interconnected like a blanket. The molded electrode is continuous to be able to carry a current and perform as an emitter. The material may also be preformed as a screen of overlaying or interwoven long fibers. It is important that the molded electrode be tightly bonded to the panel laminations avoiding any electrical disconnects or gaps therewith. One of the advantages of molding an electrode of fibers is that they can be sufficiently flexible to follow the contour of the joint lines while spaced a uniform predetermined distance from the adhesive such as a distance of about 3-5 min.

The thermoset adhesive 25 is desirably selected from the group of epoxy, urethane, phenolic and acrylic. The adhesive is deposited as a paste in quantities to fill the spacing between the surfaces to be bonded. Such surfaces are arranged so that they are positioned, or held apart, a distance of about 10-100 mils. Such spacing may be facilitated by using: a positioning fixture for the structural parts positively locates them at such distance, bosses or stand-offs that may be an integral part of the structure, or glass beads deposited along with the adhesive. The adhesive paste may be deposited manually or robotically. If the selected adhesive is a 2 part adhesive, it may have an open time of anywhere from 0.5-3.0 hours before the curing cycle must take place. To promote a solid bond, the adhesive should be continuous, but may be irregular if that is the design of the joint.

Figure 3:
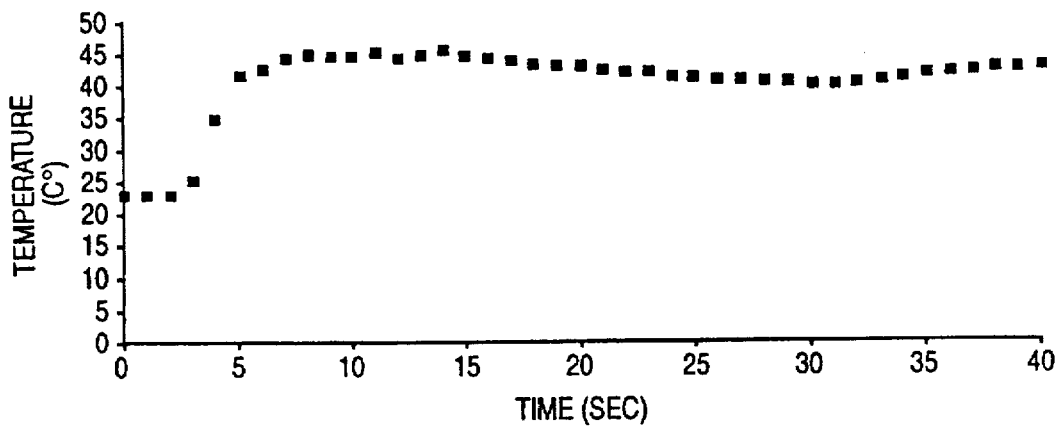
FIG. 3 is a graphical illustration of temperature rise as a function of time in the thermoset adhesive as it is cured by practice of this invention.

The structures 14 and 12 are then assembled together as an assembly 30 with the adhesive 25 squeezed into contact with each of the mating surfaces. The structures need not necessarily be held together with high pressure but with sufficient pressure so that contact of the adhesive with the mating surfaces is maintained during the curing cycle. The embedded or molded electrode 29 is then connected in a circuit 31 with the complimentary exterior electrode 26 that has been previously formed to fit along the exterior 32 of one side of the assembly 30 as shown in FIG. 2. Such exterior electrode may be comprised of aluminum, brass, or copper. The electrodes are powered by a radio frequency generator that creates an electrical field of a frequency in the range of 10-100 megacycles; adjusting the voltage of such current influences the field strength. A typical radio frequency generator will have a voltage adjusting range usually from 1 to 40 kilovolts. The electrodes should be capable of raising the temperature of the adhesive from as little as 20° C. to as much as 130° C. in about 30 seconds. As shown in FIG. 3, this rate of temperature increase may take place in a short span of time. The time period for which heat should be maintained at the desired level is dependent upon the type of adhesive used but typically such time period is 30-120 seconds. Once such cure cycle is achieved, the current is stopped and the heating ceases but the contact pressure should be maintained during a cool down for a period sufficient to insure mechanical stability of the bond upon removal from the electrodes and bonding fixture. Typically this cool down period may be about 10-90 seconds.

The resulting joint from the practice of this method is advantageously indistinguishable from any other joint cured by any other method. But the method of this invention allows rapid development of joint strength which reduces facility costs by minimizing the number of bonding stations needed to produce a given number of bonded structures, reduces the cycle time of effecting joints to 6 minutes or less, and facilitates the manufacture of low volume vehicles that are produced in volumes of 20,000-50,000 units per year.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of curing inaccessible thermoset adhesive joints, comprising:
   (a) forming plastic composite structures to be bonded at mating surfaces when assembled to form a load supporting frame, the shortest distance from the mating surfaces to the exterior of the assembly inhibiting the application of radio frequency heating by exterior electrodes;
   (b) while forming said structures, embedding and molding into at least one of said structures, spaced from the surfaces to be adhered, an electrode of sufficient thickness and spacing to project radio frequency waves through said one structure to said adhesive when energized, said electrode being formed of fibers or a thin film;
   (c) assembling the surfaces together with a thermoset adhesive therebetween in intimate contact with each of the surfaces; and
   (d) connecting said fiber or thin film electrode in a circuit for passing radio frequency waves across the adhesive to effect dielectric heating of the adhesive for a controlled period of time and at a predetermined temperature rise for curing.

2. The method as in claim 1, in which the chemistry of said fiber or thin film electrode is selected from the group of carbon, low carbon steel, aluminum, iron, copper and brass.

3. The method as in claim 1, in which the thickness of the molded in place electrode is sufficiently thick to carry current.

4. The method as in claim 1, in which said fiber or thin film electrode is flexibly molded to follow the contour of a complex joint line in spaced relationship thereto.

5. The method as in claim 1, in which the adhesive is comprised of a material selected from a group of epoxy, urethane, phenolic and acrylic, said grouping being characterized by their ability to be thermoset within less than 6 minutes.

6. The method as in claim 1, in which said adhesive fills the spacing between said structures, said structures being positioned apart a distance of 2–100 mils.

7. The method as in claim 1, in which step (d) is carried out so that the adhesive is heated to experience a temperature rise of as little as 20° C. to as much as 130° C. in about 30 seconds.

8. The method as in claim 7, in which the spacing, between said surfaces to be adhered and the molded electrode, is about 3–5 min.

* * * * *